(12) United States Patent
Nomura et al.

(10) Patent No.: US 7,992,661 B2
(45) Date of Patent: Aug. 9, 2011

(54) HYBRID VEHICLE DRIVE DEVICE

(75) Inventors: Shinichi Nomura, Anjo (JP); Yasuo Yamaguchi, Anjo (JP); Mitsugi Yamashita, Anjo (JP); Takeshi Inuzuka, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 1041 days.

(21) Appl. No.: 11/480,352

(22) Filed: Jul. 5, 2006

(65) Prior Publication Data

US 2007/0007059 A1 Jan. 11, 2007

(30) Foreign Application Priority Data

Jul. 5, 2005 (JP) .................................. 2005-196338

(51) Int. Cl.
*B60K 6/46* (2007.10)
(52) U.S. Cl. .............. 180/65.21; 180/65.22; 180/65.245
(58) Field of Classification Search ................ 180/65.21
See application file for complete search history.

(56) References Cited

U.S. PATENT DOCUMENTS

| | | | |
|---|---|---|---|
| 5,415,062 A * | 5/1995 | Kohno et al. ................ | 464/68.5 |
| 5,931,757 A | 8/1999 | Schmidt | |
| 5,934,395 A * | 8/1999 | Koide et al. ............... | 180/65.235 |
| 6,862,887 B2 * | 3/2005 | Noreikat et al. ................ | 60/716 |
| 2002/0194949 A1 | 12/2002 | Kintou et al. | |
| 2003/0106729 A1 | 6/2003 | Noreikat et al. | |
| 2006/0102409 A1 * | 5/2006 | Kamada et al. ............... | 180/249 |

FOREIGN PATENT DOCUMENTS

| | | | |
|---|---|---|---|
| DE | 19905366 A1 * | 8/2000 | |
| JP | A-6-144020 | 5/1994 | |
| JP | A-2000-309226 | 11/2000 | |
| JP | A-2003-48438 | 2/2003 | |
| JP | A-2003-63261 | 3/2003 | |
| JP | A-2005-1586 | 1/2005 | |

* cited by examiner

*Primary Examiner* — Hau Phan
*Assistant Examiner* — Katy Meyer
(74) *Attorney, Agent, or Firm* — Oliff & Berridge, PLC

(57) ABSTRACT

A hybrid vehicle drive device includes a clutch that transmits and separates a driving force between an engine output shaft and a transmission input shaft; a first electric motor having a first rotor that is connected to an engine output shaft side of the clutch; a second electric motor having a second rotor that is connected to an transmission input shaft side of the clutch; and a radial vibration suppressing device, wherein (1) the first electric motor is connected to the engine output shaft via the radial vibration suppressing device, and (2) the radial vibration suppressing device suppresses a vibration of the engine output shaft in a radial direction.

20 Claims, 5 Drawing Sheets

RELATED ART

HYBRID VEHICLE DRIVE DEVICE

INCORPORATION BY REFERENCE

The disclosure of Japanese Patent Application No. 2005-196338 filed on Jul. 5, 2005, including the specification, drawings and abstract, is incorporated herein by reference in its entirety.

BACKGROUND

The present invention relates to drive devices for hybrid vehicles having two electric motors.

U.S. Pat. No. 6,862,887 (refer to cols. 1 and 2 and FIG. 1) discloses an example of a hybrid vehicle drive device having the structure shown in FIG. 5. This hybrid vehicle drive device is structured by connecting in sequence in the direction of the power transfer of the engine 101 (i.e., left to right in FIG. 5), an engine 101, an engine output shaft 102, a first electric motor 103, a torsional vibration damper 104, a clutch 105, a second electric motor 106, a transmission input shaft 107, and a transmission 108. Here, the transmission input shaft 107 is disposed in the axial direction of the engine output shaft 102. The clutch 105 is disposed coaxially to a rotation center line 109 of the engine output shaft 102 and the transmission input shaft 107, and these two shafts 102, 107 are connected so as to enable torque transfer. The first electric motor 103 has a rotor 103a and a stator 103b connected to the engine output shaft 102, and the first electric motor 103 is disposed coaxially to the rotation center line 109. The second electric motor 106 has a rotor 106a and a stator 106b connected to the transmission input shaft 107, and the second electric motor 106 is disposed coaxially to the rotation center line 109. The torsional vibration damper 104 is connected to the engine output shaft 102 and to the engine side (primary side) portion of the clutch 105 so as to be held stationary. In addition, the rotor 103a of the first electric motor 103 is connected to the engine output shaft 102 so as to enable torque transfer, this connection being to the left side of the torsional vibration damper 104 in the power transfer direction of the engine 101.

SUMMARY

An object of the structure of this hybrid vehicle drive device is to realize the optimal installation of the overall system by reducing the necessary installation space.

However, in the structure of the hybrid vehicle drive device disclosed in U.S. Pat. No. 6,862,887, the rotor 103a of the first electric motor 103 is directly connected to the engine output shaft 102. A phenomenon thus occurs in which the rotor 103a of the first electric motor 103 vibrates in a radial direction because the vibration induced by the rotation of the crank shaft of the engine 101 in the radial direction is transmitted thereto. Therefore, in order to prevent collisions between the rotor 103a and the stator 103b of the first electric motor 103, the device must be designed such that a large air gap is provided between the rotor 103a and the stator 103b. Thereby, the performance of the electric motor deteriorates, and the installation of the electric motor in the vehicle becomes more difficult because the size of the electric motor must be increased.

Considering the problems described above, one of the various objects of the present invention is to provide a hybrid vehicle drive device that, in a configuration including two electric motors, decreases the size of the air gap between the rotor and the stator of the electric motor on the engine side, and further increases the electric motor performance and decreases the electric motor size.

In order to attain these objects, the structure of the hybrid vehicle drive device according to the present invention includes a clutch that transmits and separates a driving force between an engine output shaft and a transmission input shaft; a first electric motor having a first rotor that is connected to an engine output shaft side of the clutch; a second electric motor having a second rotor that is connected to an transmission input shaft side of the clutch; and a radial vibration suppressing device, wherein (1) the first electric motor is connected to the engine output shaft via the radial vibration suppressing device, and (2) the radial vibration suppressing device suppresses a vibration of the engine output shaft in a radial direction.

The structure of the hybrid vehicle drive device according to the present invention can also include a clutch that transmits and separates a driving force between an engine output shaft and a transmission input shaft; a first electric motor having a first rotor that is connected to an engine output shaft side of the clutch; a second electric motor having a second rotor that is connected to an transmission input shaft side of the clutch; and a transmission plate, wherein (1) the first electric motor is connected to the engine output shaft via the transmission plate, and (2) the transmission plate suppresses a vibration of the engine output shaft in a radial direction.

Note that in the present specification, the concept of being "connected" denotes not only a direct connection between members, but also includes indirect connections between members via one or more members. In addition, an "indirect connection" also denotes a connection between members via a member that enables a disengaging operation of a clutch or the like.

BRIEF DESCRIPTION OF THE DRAWINGS

Various embodiments of the invention will be described with reference to the drawings, wherein.

DETAILED DESCRIPTION OF EMBODIMENTS

Below, a first embodiment of the present invention will be explained with reference to the drawings.

Figure 1:
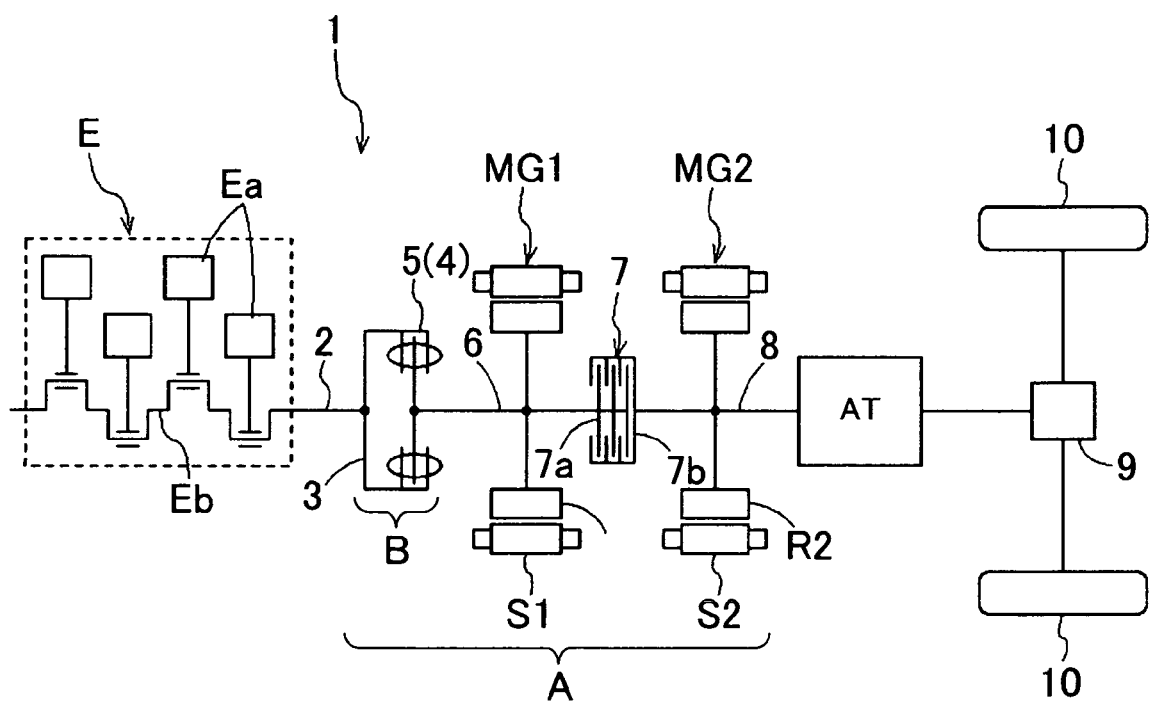
FIG. 1 is an explanatory drawing showing a schematic structure of a hybrid vehicle drive device according to an embodiment of the present invention.
Figure 2:
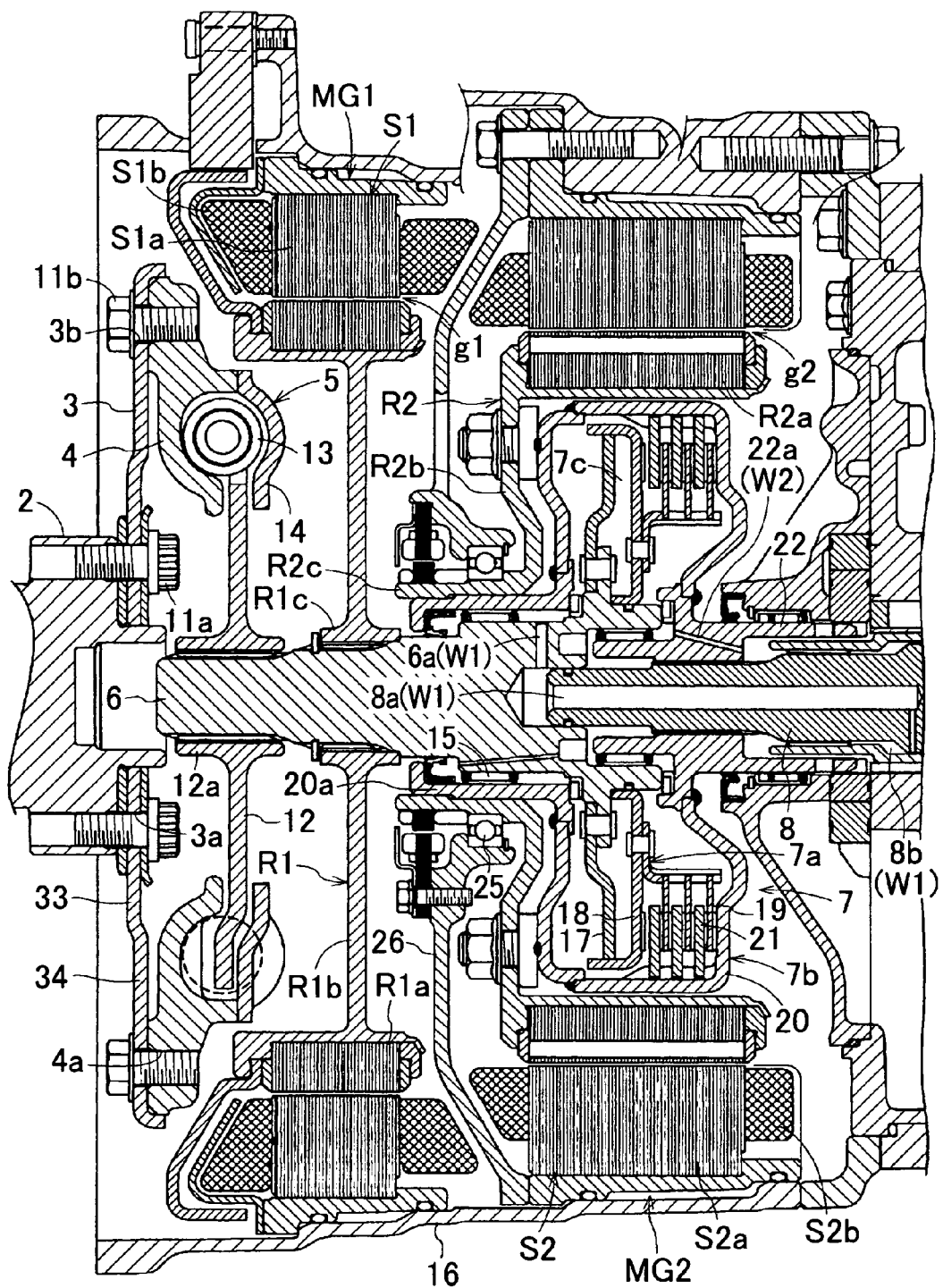
FIG. 2 is a cross-sectional view showing a specific structure of section A in FIG. 1 in a first embodiment of the present invention.
Figure 3:
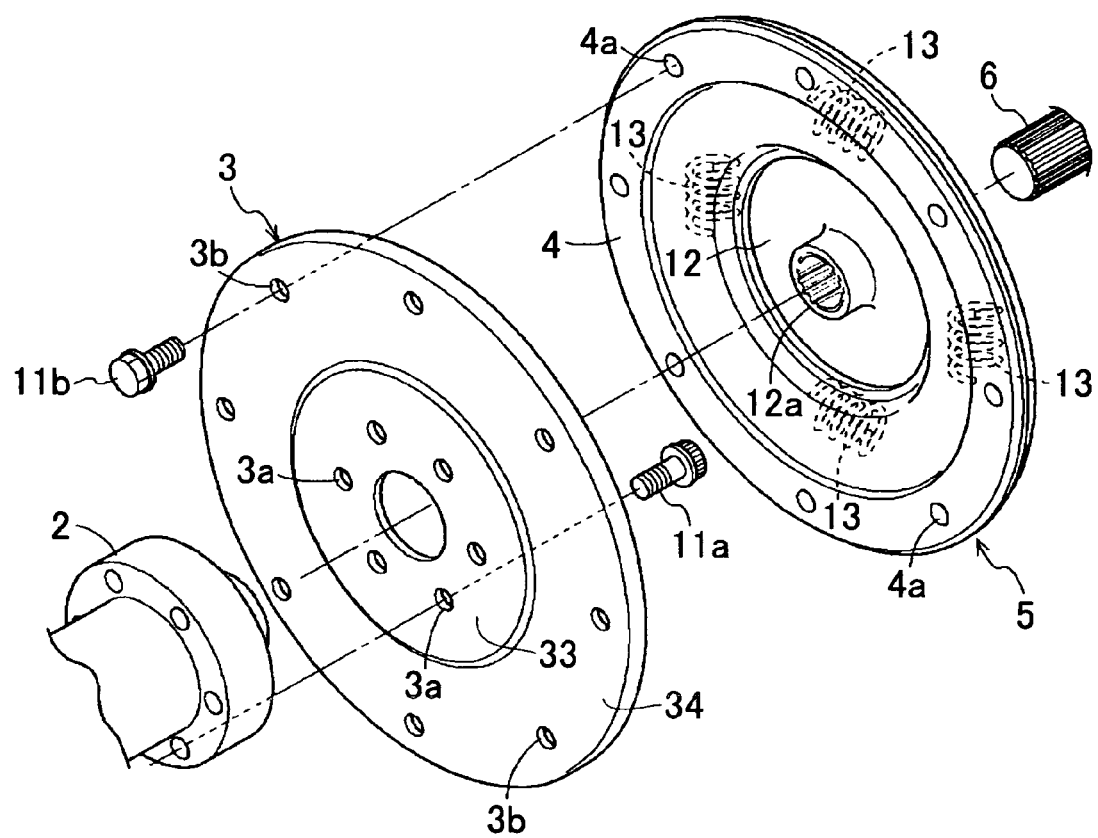
FIG. 3 is an exploded perspective view showing a specific structure of section B in FIG. 1.

FIG. 1 is an explanatory drawing showing a schematic structure of a hybrid vehicle drive device 1 according to the present embodiment. FIG. 2 is a cross-sectional view showing a specific structure of section A in FIG. 1. FIG. 3 is an exploded perspective view showing a specific structure of section B in FIG. 1.

As shown in FIG. 1, the hybrid vehicle drive device 1 includes two motor-generators MG1 and MG2 between the engine E and the automatic transmission AT. In addition, along the transfer path of the driving force from the engine output shaft 2 driven by the engine E (i.e., left to right in FIG. 1), the hybrid vehicle drive device 1 includes in sequence a damper 5 that includes a drive plate 3 and a flywheel 4, an intermediate shaft 6, a first motor-generator MG1, a clutch 7, a second motor-generator MG2, and a transmission input shaft 8. The speed of the drive rotation of the transmission input shaft 8 is shifted by the automatic transmission AT and transmitted to the drive wheels 10 via a differential gear 9. Below, with respect to the direction along the transfer path of the driving force, the side from the engine E toward the automatic transmission AT is denoted "toward the right hand side of the transmission" and the side from the automatic transmission AT toward the engine E is denoted "toward the left hand side of the transmission". In addition, a member of the clutch 7 on the engine output shaft 2 side (towards the left side of the transmission) is denoted the "primary side member 7*a*" and a member of the clutch 7 on the transmission input shaft 8 side (towards the right side of the transmission) is denoted the "secondary side member 7*b*".

In addition, with respect to the structural arrangement, as shown in FIG. 2, the engine output shaft 2, the intermediate shaft 6, and the transmission input shaft 8 are disposed coaxially in sequence from the engine E side. Additionally, in the vicinity of these shafts, the damper 5 that includes the drive plate 3 and the flywheel 4, the first motor-generator MG1, and the second motor-generator MG2 and the clutch 7 are disposed in sequence from the engine E side.

In addition, the hybrid vehicle drive device 1 is structured such that control is carried out in which the clutch 7 switches between the engaged state and the disengaged state when the engine E switches between the activated state and the deactivated state, and the functions of the first motor-generator MG1 and the second motor-generator MG2 respectively switch between motor and generator. Thereby, the engine E and the motor-generators MG1 and MG2 are used cooperatively, and driving is carried out efficiently.

In the present embodiment, the first motor-generator MG1 forms the "first electric motor" in the present invention, and the second motor-generator MG2 forms the "second electric motor" in the present invention. Below, the structure of each of the components of the hybrid vehicle drive device 1 according to the present embodiment will be specifically explained.

1. Engine E and Engine Output Shaft 2

As shown in FIG. 1, the engine E is an internal combustion engine such as a gasoline engine, and structured such that the movement of the pistons Ea reciprocating in the cylinders (not illustrated) is converted to a rotational movement by the crankshaft Eb to rotationally drive the engine output shaft 2. Here, the engine output shaft 2 is directly connected to the crankshaft Eb. Therefore, the vibration (vibration in the form of precession, below referred to as "precessional vibration") in a radial direction induced by the rotation of the crankshaft Eb is transmitted to the engine output shaft 2. Note that the engine output shaft 2 may either be integrated with the crankshaft Eb or separate from the crankshaft Eb. The engine output shaft 2 is connected to the drive plate 3 toward the right hand side of the transmission.

2. Drive Plate 3

The drive plate 3 is a member for transferring the driving force (drive rotation) of the engine output shaft 2 to the damper 5 toward the right hand side of the transmission. As shown in FIG. 2 and FIG. 3, the drive plate 3 is a disk-shaped body that connects at the shaft center side to the engine output shaft 2, and connects at the outer circumferential side to the rotor R1 of the first motor-generator MG1 via the damper 5 and the intermediate shaft 6. Specifically, plural shaft center side inserting holes 3*a* are included along the circumferential direction in the shaft center side portion of the drive plate 3. In addition, plural bolts 11*a* inserted into the shaft center side inserting holes 3*a* are screwed into female screws (not illustrated) formed in the end portion of the engine output shaft 2 toward the right hand side of the transmission. Thereby, the engine output shaft 2 is joined to a side surface of the shaft center side portion of the drive plate 3 toward the left hand side of the transmission. Similarly, plural outer circumferential side inserting holes 3*b* are included along the circumferential direction in the outer circumferential side portion of the drive plate 3. In addition, plural bolts 11*b* inserted into the outer circumferential side inserting holes 3*b* are screwed into the female screws 4*a* formed on the outer circumferential portion of the flywheel 4 included on the damper 5. Thereby, the damper 5 is joined to the side surface of the outer circumferential side portion of the drive plate 3 toward the right hand side of the transmission. The rotor R1 of the first motor-generator MG1 is connected to the side of the damper 5 towards the right hand side of the transmission via the intermediate shaft 6. Therefore, the rotor R1 of the first motor-generator MG1 is connected to the outer circumferential side portion of the drive plate 3 via the damper 5 and the intermediate shaft 6.

The drive plate 3 is formed so as to permit bending in the radial direction. Here, the drive plate 3 is formed in such a way that, because the drive plate 3 has a disk shape, the deformation in the thickness direction is permitted, and because the deformation load is dissipated in this thickness direction, bending in the radial direction is permitted. Here, this radial bending occurs due to the vibration in the radial direction of the shaft center portion to which the engine output shaft 2 is joined. Thereby, the radial vibration (precessional vibration) of the engine output shaft 2 is absorbed, and the transmission of this vibration toward the right hand side of the transmission is suppressed. In contrast, the drive plate 3 is structured so as to bend little in the circumferential direction, and thereby the driving force (drive rotation) from the engine output shaft 2 is reliably transferred to the damper 5 towards the right hand side of the transmission. In addition, the drive plate 3 is formed of steel and has a thickness of 2-3 mm, for example.

In addition, here the drive plate 3 has a stepped shape that includes steps in the middle portion in the radial direction. As such, the drive plate 3 is divided into an inner portion 33 (shaft center portion) and an outer portion 34 (outer circumferential portion). As illustrated in FIGS. 2 and 3, the inner portion 33 is a flat plate that extends substantially radially from the engine output shaft 2 to the stepped portion that connects the inner portion 33 to the outer portion 34. Similarly, the outer portion 34 is a flat plate that extends substantially radially from the stepped portion that connects the inner portion 33 to the outer portion 34 and the flywheel 4. The inner portion 33 and the outer portion 34 are also formed such that the inner portion 33 is located on the engine E side relative to the outer portion 34 in the axial direction. As should be appreciated, the drive plate 3 has a stepped shape function as a point of support such that the stress of bending in the radial direction is dispersed.

In the present embodiment, this drive plate 3 corresponds to the "transmission plate" in the present invention, and forms the "radial vibration suppressing device".

3. Damper 5 with a Flywheel 4

The damper 5 is a device for absorbing the vibration, that is, absorbing the fluctuations in rotation, of the engine output shaft 2 in the rotational direction that is transmitted via the drive plate 3. As shown in FIG. 2 and FIG. 3, the damper 5 is structured so as to have a driven plate 12, a flywheel 4, a damper spring 13, and a spring cover 14. The driven plate 12 is a rigid disk-shaped body that forms the body of the damper 5. The driven plate 12 engages the outer circumference of the intermediate shaft 6 via a boss portion 12a that is included on the shaft center side and extends in the axial direction. A spline is formed on the inner circumferential surface of the boss portion 12a and the outer circumferential surface of the intermediate shaft 6, and the boss portion 12a and the intermediate shaft 6 are spline-engaged thereby. The flywheel 4 is joined to the outer circumferential portion of the drive plate 3, and is disposed between the driven plate 12 and the drive plate 3. Under these circumstances, the flywheel 4 can rotate relative to the driven plate 12.

One end of the damper spring 13 is coupled with the flywheel 4, and the other end of the damper spring 13 is coupled with the driven plate 12. The damper spring 13 is disposed between the flywheel 4 and the driven plate 12 so as to be able to compress and expand. Therefore, the driving force (drive rotation) is transferred between the flywheel 4 and the driven plate 12 via the damper spring 13. Under these circumstances, due to the expansion and compression of the damper spring 13, relative rotation between the flywheel 4 and the driven plate 12 is permitted. In addition, the urging force caused by the expansion and compression of the damper spring 13 acts in a direction in which a change of the relative angular rotation between the driven plate 12 and the flywheel 4 is suppressed, and thereby the vibration of the engine output shaft 2 in the rotational direction is suppressed. The spring cover 14 is a cover that is disposed opposite to the flywheel 4 so as to interpose the driven plate 12 therebetween, and covers the outer circumferential area of the damper spring 13 and the driven plate 12. The outer circumferential end portion of this spring cover 14 is included by being integrally fastened to the flywheel 4.

4. Intermediate Shaft 6

As shown in FIG. 1, the intermediate shaft 6 is a shaft for connecting the engine output shaft 2 and the primary side member 7a of the clutch 7. As shown in FIG. 2, the intermediate shaft 6 is disposed coaxially to the engine output shaft 2 and the transmission input shaft 8. Toward the left hand side of the transmission in sequence, the driven plate 12 of the damper 5, the rotor R1 of the first motor-generator MG1, and the primary side member 7a of the clutch 7 are engaged with the intermediate shaft 6. Here, the driven plate 12 and the rotor R1 of the first motor-generator MG1 are each independently spline-engaged by a spline formed in the outer circumferential surface of the intermediate shaft 6. Due to being engaged in this manner, the rotor R1 of the first motor-generator MG1 and the driven plate 12 of the damper 5 can be assembled in sequence on the intermediate shaft 6, and the assembly thereby is facilitated. The primary side member 7a of the clutch 7 is included so as to rotate integrally with the intermediate shaft 6 on the outer circumference of the end portion of the intermediate shaft 6 toward the right hand side of the transmission. In addition, on the outer circumferential surface of the intermediate shaft 6 between the rotor R1 of the first motor-generator MG1 and the primary side member 7a of the clutch 7, the secondary side member 7b of the clutch 7 (the cylindrical portion 20a of the clutch housing 20 described below) and the rotor R2 of the second motor-generator MG2 are supported so as to be able to rotate relative to the intermediate shaft 6 via a bearing 15. In the inner portion of the intermediate shaft 6 toward the right hand side of the transmission, the transmission input shaft 8 is fitted so as to be able to rotate relatively. In addition, an intermediate shaft connecting oil passage 6a is formed in the intermediate shaft 6 so as to pass from the portion of the intermediate shaft 6 into which the transmission input shaft 8 is fitted into the outer circumferential surface of the intermediate shaft 6 in the radial direction. Thereby, the shaft center oil passage 8a, which penetrates the shaft center portion of the transmission input shaft 8 in the axial direction, communicates with the hydraulic chamber 7c of the clutch 7.

5. First Motor Generator MG1

The first motor-generator MG1 may be, for example, a brushless DC motor. The first motor-generator MG1 rotationally drives the intermediate shaft 6 when power is supplied from a battery (not illustrated) or carries out power regeneration when rotationally driven by the intermediate shaft 6. The first motor-generator MG1 is structured so as to have a rotor R1 and a stator S1. The rotor R1 has a laminated plate R1a that has a permanent magnet embedded therein and a rotor supporting portion R1b that supports this laminated plate R1a. The rotor supporting portion R1b is engaged with the outer circumference of the intermediate shaft 6 toward the right hand side of the transmission with respect to the boss portion 12a of the driven plate 12 via a boss portion R1c that is included on the shaft center side and extends in the radial direction. A spline is formed on the inner circumferential surface of the boss portion R1c and the outer circumferential surface of the intermediate shaft 6, and the boss portion R1c and the intermediate shaft 6 are spline-engaged with each other thereby. The stator S1 is structured so as to have a stator core S1a and a stator coil S1b. The stator core S1a is disposed opposite to the laminated plate R1a of the rotor R1 so as to provide a slight air gap g1 therebetween. The stator coil S1b is wrapped around this stator core S1a. The stator core S1a is fastened to a case 16 that covers, for example, the outer circumference of the first motor-generator MG1 and the second motor-generator MG2.

As described above, the rotor R1 of the first motor-generator MG1 is connected to the primary side member 7a of the clutch 7 via the intermediate shaft 6. In addition, this rotor R1 is connected to the drive plate 3 via the intermediate shaft 6, the damper 5, and the flywheel 4 included on the damper 5, and is then connected to the engine output shaft 2 via the drive plate 3. Therefore, when the clutch 7 is disengaged, this rotor R1 is connected so as to be able to transfer the driving force to the engine output shaft 2 via the intermediate shaft 6, the damper 5, and the drive plate 3.

6. Clutch 7

The clutch 7 is a device that transfers and suspends the driving force (drive rotation) between the engine output shaft 2 and the transmission input shaft 8. Here, as shown in FIG. 2, the clutch 7 may be of a wet-type multi-plate clutch in which plural clutch disks 19 and clutch plates 21 are alternately disposed in the axial direction. The clutch 7 is disposed so as to be accommodated inside the rotor R2 of the second motor-generator MG2 in the radial direction. The configuration of this clutch 7 is divided into the primary side member 7a that rotates integrally with the intermediate shaft 6 included toward the left hand side of the transmission and the secondary side member 7b that rotates integrally with the rotor R2 of the second motor-generator MG2 and the transmission input shaft 8 included toward the right hand side of the transmission.

The primary side member 7a is structured so as to have a disk-shaped supporting plate 17 that extends outward from the outer circumferential surface of the intermediate shaft 6 in the radial direction, a piston 18 that is disposed opposite to this supporting plate 17 and is able to slide in the axial direction of the intermediate shaft 6 using oil pressure, and plural clutch disks 19 that are integrally supported by the piston 18.

Here, the piston 18 is a donut shaped member having a U-shape in cross-section, and has a cylindrical inner circumferential surface and an outer circumferential surface that are parallel to the outer circumferential surface of the intermediate shaft 6 and a supporting surface that is parallel to the supporting plate 17. In addition, the piston 18 has an inner circumferential surface that fits so as to be able to slide on the outer circumferential surface of the intermediate shaft 6 and an outer circumferential surface that fits so as to be able to slide on the outer circumferential edge of the supporting plate 17. Additionally, a hydraulic chamber 7*c* is formed between the piston 18 and the supporting plate 17. Because the piston 18 slides in the axial direction of the intermediate shaft 6, the plural clutch disks 19 abut against or separate from the plural clutch plates 21, and the clutch 7 is thereby engaged or disengaged.

The secondary side member 7*b* is structured so as to have a clutch housing 20, the plural clutch plates 21, and an output sleeve 22. The clutch housing 20 is formed so as to surround the vicinity of the primary side member 7*a*. The plural clutch plates 21 are integrally supported on the inner circumferential surface of this clutch housing 20 and are respectively inserted between the plural clutch disks 19. The output sleeve 22 is integrally fastened to the clutch housing 20 and is spline-engaged with the outer circumference of the transmission input shaft 8. Here, the end portion of the transmission input shaft 8 side of the clutch housing 20 is integrally fastened to the output sleeve 22 by welding or the like. Therefore, the clutch housing 20 integrally rotates with the transmission input shaft 8. In addition, on the engine output shaft 2 side, the clutch housing 20 has a cylindrical portion 20*a* that extends opposite and parallel to the outer circumferential surface of the intermediate shaft 6. This cylindrical portion 20*a* is supported so as to be able to rotate relative to the outer circumferential surface of the intermediate shaft 6 via the bearing 15. The rotor supporting portion R2*b* of the rotor R2 of the second motor-generator MG2 is fit on and fastened to the outer circumferential surface of the cylindrical portion 20*a*. Therefore, the rotor R2 of the second motor-generator MG2 rotates integrally with the clutch housing 20 and the transmission input shaft 8. In addition, a sleeve connection oil passage 22*a* is formed in the output sleeve 22. The sleeve connection oil passage 22*a* communicates with the outer circumferential oil passage 8*b*, which penetrates the outer circumferential area of the transmission input shaft 8 in the axial direction, and the inside of the clutch housing 20.

The clutch 7 is coupled to an oil pump (not illustrated) by a first oil passage W1 and a second oil passage W2. The first oil passage W1 is formed so as to include the shaft center oil passage 8*a* of the transmission input shaft 8 and the intermediate shaft connecting oil passage 6*a* of the transmission input shaft 6. The second oil passage W2 is formed so as to include the outer circumferential oil passage 8*b* of the transmission input shaft 8 and the sleeve connection oil passage 22*a* of the output sleeve 22. In addition, the first oil passage W1 and the second oil passage W2 form a circulating oil passage in which the oil is supplied into the clutch housing 20 from one oil passage and discharged from the other oil passage. Thereby, the clutch 7 can be engaged or disengaged by controlling the position of the piston 18. Here, in the clutch 7, the primary side member 7*a* is connected to the engine output shaft 2 via the intermediate shaft 6, the damper 5, and the drive plate 3, and the secondary side member 7*b* is connected to the transmission input shaft 8. Therefore, the clutch 7 is connected to the engine output shaft 2 and the transmission input shaft 8 while engaged, and disconnected from the engine output shaft 2 and the transmission input shaft 8 while disengaged.

7. Second Motor-Generator MG2

The second motor-generator MG2 may be, for example, a brushless DC motor. The second motor-generator MG2 rotationally drives the transmission input shaft 8 when power is supplied from a battery (not illustrated) or carries out power regeneration when rotationally driven by the transmission input shaft 8. The second motor-generator MG2 is structured so as to have a rotor R2 and a stator S2. The rotor R2 has a laminated plate R2*a* having a permanent magnet embedded therein and a rotor supporting portion R2*b* that supports this laminated plate R2*a*. The rotor supporting portion R2*b* is fitted in and integrally fastened to the outer circumferential surface of the cylindrical portion 20*a* of the clutch housing 20 via a substantially cylindrical boss portion R2*c* that is included on the shaft center side and extends toward the engine output shaft 2 in the axial direction. The outer circumferential surface of the boss portion R2*c* is supported by a supporting member 26 via the bearing 25 so as to be relatively rotatable. The supporting member 26 is integrally supported by both the stator S2 and the case 16, and forms a disk shape extending inward in the radial direction. The stator S2 is structured so as to have a stator core S2*a* and a stator coil S2*b*. The stator core S2*a* is disposed opposite to the laminated plate R2*a* of the rotor R2 so as to provide a slight air gap g2 therebetween. The stator coil S2*b* is wrapped around this stator core S2*a*. The stator core S2*a* is fastened to a case 16 that covers, for example, the outer circumference of the first motor-generator MG1 and the second motor-generator MG2.

As described above, the rotor R2 of the second motor-generator MG2 is connected to the secondary side member 7*b* of the clutch 7 in a cylindrical portion 20*a* of the clutch housing 20. In addition, this rotor R2 is connected to the transmission input shaft 8 via the clutch housing 20, which forms the secondary side member 7*b* of the clutch 7, and the output sleeve 22. Therefore, this rotor R2 is connected so as to be able to transfer the driving force to the transmission input shaft 8 while the clutch 7 is released.

8. The Automatic Transmission at and the Transmission Input Shaft 8

As shown in FIG. 1, the transmission input shaft 8 is the input shaft of the automatic transmission AT, and the driving force (drive rotation) from the engine E and the motor-generators MG1 and MG2 is transferred thereto. The explanation of the detailed structure of the automatic transmission AT is omitted, and any well-known automatic transmission mechanism can be used. Therefore, for example, a stepped automatic transmission having a planetary gear mechanism or a stepless transmission mechanism such as a belt-type CVT (continuously variable transmission) or the like can be used.

According to the structure described above, while the engine E is operating, even when the engine output shaft 2 vibrates in the radial direction (precessional vibration), the vibration in a radial direction is absorbed because the drive plate 3 bends in the radial direction. Thereby, the transmission of the vibration of the engine output shaft 2 in the radial direction to the rotor R1 of the first motor-generator MG1 toward the right hand side of the transmission is suppressed. Therefore, the air gap g1 between the rotor R1 and the stator S1 of the first motor-generator MG1 can be made small. Thus, it is possible to implement performance improvements in the first motor-generator MG1 in addition to a reduction in the size at the same level of performance. Additionally, because the drive plate 3 has a simple disk-shaped structure, it is possible to avoid increasing the overall size of the hybrid vehicle drive device 1.

In contrast, because the drive plate 3 bends little in the circumferential direction, the driving force (drive rotation)

from the engine output shaft 2 is reliably transferred toward the right hand side of the transmission. In addition, under these circumstances, because the damper 5 is included on the drive plate 3 toward the right hand side of the transmission, the vibration of the engine output shaft 2 in the rotational direction is absorbed by the damper 5. Therefore, the transmission of the vibration of the engine output shaft 2 in the rotational direction to the rotor R1 of the first motor-generator MG1 can be suppressed, and thereby the control of the first motor-generator MG1 can be simplified. In addition, because the flywheel 4 included on the damper 5 generates inertia in the rotational direction, the rotation of the drive plate 3 towards the right side of the transmission can be stabilized. Therefore, the transmission of the vibration of the engine output shaft 2 in the radial and rotational directions to the rotor R1 of the first motor-generator MG1 toward the right hand side of the transmission can be further suppressed.

Second Embodiment

Figure 4:
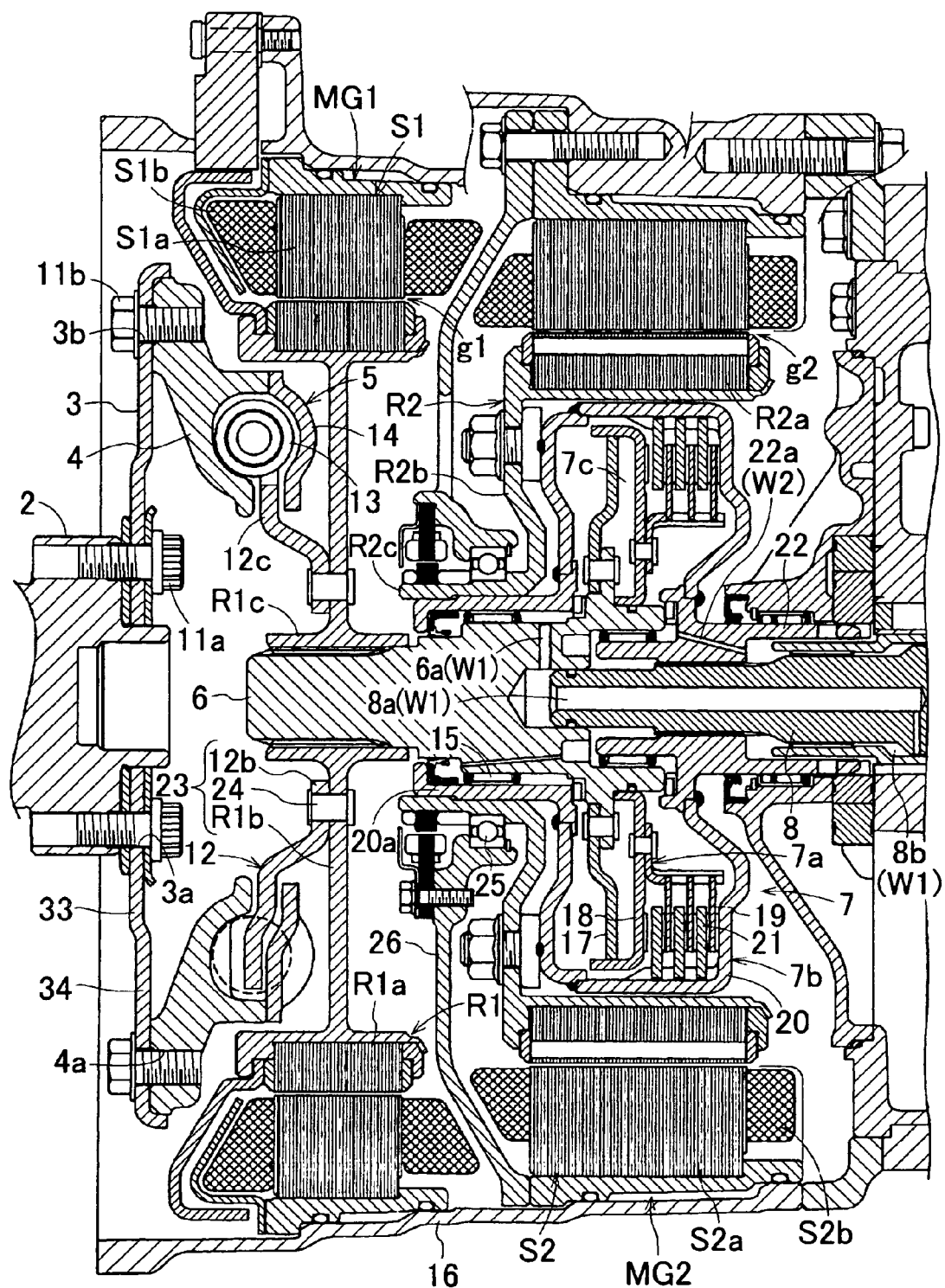
FIG. 4 is a cross-sectional view showing a specific structure of section A in FIG. 1 in a second embodiment of the present invention.
Figure 5:
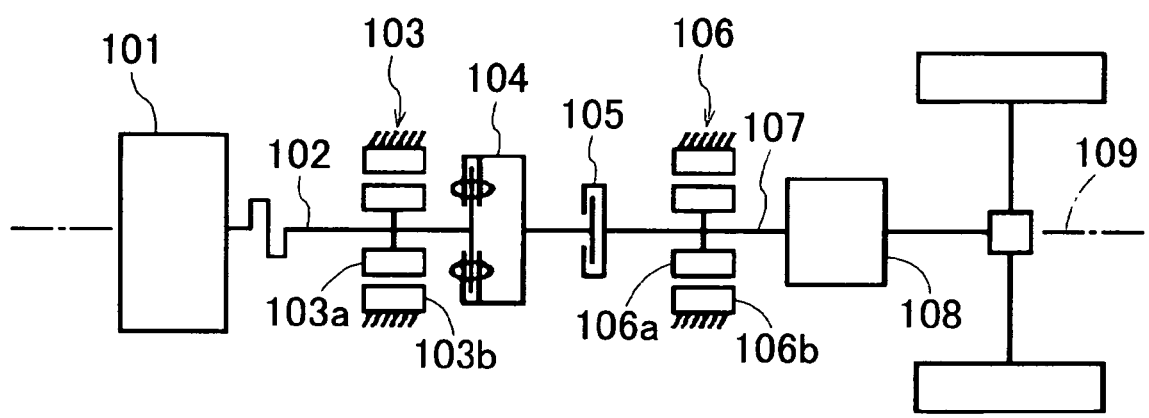
FIG. 5 is an explanatory drawing showing a schematic structure of the hybrid vehicle drive device according to the related art.

Next, the hybrid vehicle drive device 1 according to a second embodiment of the present invention will be explained. The schematic structure of the hybrid vehicle drive device 1 according to the present embodiment is identical to the first embodiment described above. FIG. 4 is a cross-sectional view showing a specific structure of section A in FIG. 1 in the hybrid vehicle drive device 1 according to the present embodiment. As shown in this figure, the hybrid vehicle drive device 1 according to the present embodiment differs from the first embodiment described above on the point that the rotor R1 of the first motor-generator MG1 and the damper 5 are integrally coupled by a coupling member 23, and this coupling member 23 is spline-engaged with the intermediate shaft 6. The other structures are identical to those of the first embodiment described above.

In the present embodiment, instead of the boss portion 12a that is used in the first embodiment described above, the driven plate 12 of the damper 5 includes a joining portion 12b that is joined to the rotor supporting portion R1b of the first motor-generator MG1. This joining portion 12b includes a surface portion that is parallel to the rotor supporting portion R1b, and is joined to the side surface of the rotor supporting portion R1b by a joining member 24 such as a rivet or the like. In addition, similar to the first embodiment described above, the rotor supporting portion R1b of the first motor-generator MG1 is spline-engaged with the outer circumference of the intermediate shaft 6 via a boss portion R1c included on the shaft center side and extending in the axial direction. Note that here, the joining portion 12b of the driven plate 12 is formed by being offset toward the first motor-generator MG1 side with respect to the outer circumferential portion 12c that is joined to the damper spring 13.

In the present embodiment, the joining member 24, the joining portion 12b of the driven plate 12, and the rotor supporting portion R1b of the first motor-generator MG1 form the "coupling member 23" of the present invention.

According to the structure described above, the rotor R1 of the first motor-generator MG1 and the driven plate 12 of the damper 5 can be spline-engaged with the intermediate shaft 6 by being integrated by the coupling member 23. Therefore, similar to the first embodiment described above, compared to the case in which the rotor R1 of the first motor-generator MG1 and the driven plate 12 of the damper 5 are each independently engaged with the intermediate shaft 6, the length of the engaging portion of the intermediate shaft 6 in the axial direction can reduced. Therefore, the length of the overall hybrid vehicle drive device 1 can be reduced in the axial direction, and it is thereby possible to reduce the size of the device.

Other Embodiments (1) In each of the embodiments described above, a structure was explained in which a drive plate 3 serving as a transmission plate was connected to the engine output shaft 2 toward the right hand side of the transmission, and a damper 5 that includes a flywheel 4 connected to the drive plate 3 toward the right hand side of the transmission. However, this does not limit the applicable scope of the present invention. For example, a structure in which the disposition of the transmission plate and the damper 5 is interchanged, the damper 5 being connected to the engine output shaft 2 toward the right hand side of the transmission and the transmission plate being connected to the damper 5 toward the right hand side of the transmission, is also an advantageous embodiment. In this case as well, the structure of the transmission plate itself may be identical to that of the drive plate 3 in the first embodiment described above. However, in this case, the engine output shaft 2 is connected to the transmission plate via the damper 5 (and the flywheel 4) on the outer circumferential side thereof, and the intermediate shaft 6 is connected to the shaft center side. Therefore, in this case, the transmission plate serves as a driven plate on the driven side, and in the first embodiment of the damper 5 described above, the member that is the driven plate 12 serves as the drive plate of the driving side.

(2) In addition, the structure of the radial vibration suppressing device is not limited to the transmission plate disclosed in each of the embodiments described above. For example, forming the drive plate 3 in the first embodiment described above by a rigid member and including a coupling, such as an Oldham coupling, that can absorb the vibration in the radial direction to serve as the radial vibration suppressing device between this drive plate 3 and the engine output shaft 2 is also one advantageous embodiment. Note that the position of such a coupling may be any arbitrary position between the engine output shaft 2 and the rotor R1 of the first motor-generator MG1.

According to an exemplary aspect of the invention, the radial vibration suppressing device can suppress the transmission of vibration in the radial direction to the rotor of the first electric motor. Here, the vibration is induced by the rotation of the crankshaft of the engine. Thereby, the vibration of the rotor of the first electric motor in the radial direction is suppressed, and it is possible to design the device such that a small air gap is provided between the rotor and the stator of the first electric motor. Therefore, it is possible both to improve the performance and to decrease the size of the electric motor.

According to an exemplary aspect of the invention, due to the bending of the transmission plate in the radial direction, it is possible to absorb and suppress the vibration in the radial direction induced by the rotation of the crankshaft of the engine. In addition, because the structure is a simple one in which only the plate shaped transmission plate is included between the first electric motor and the engine output shaft, it is possible to avoid increasing the size of the device.

According to an exemplary aspect of the invention, it is thereby possible to stabilize the rotation of the portion of the first electric motor on the rotor side with respect to the transmission plate, and it is possible to suppress further the vibration of the rotor of the first electric motor in the radial direction.

According to an exemplary aspect of the invention, the transmission of the vibration of the engine output shaft in the rotational direction to the rotor of the first electric motor can be suppressed by the damper. Therefore, in the first electric motor, the rotation of the rotor is stable and control becomes simplified.

According to an exemplary aspect of the invention, because it is possible to assemble the rotor of the first electric motor and the damper in sequence onto the intermediate shaft, there is the advantage that the assembling workability is improved.

According to an exemplary aspect of the invention, because the rotor of the first electric motor and the damper are integrated by a coupling member and are spline-engaged with the intermediate shaft, in comparison to the case in which the rotor of the first electric motor and the damper are each engaged independently with the intermediate shaft, it is possible to reduce the length of the engagement portion of the intermediate shaft in the axial direction. Therefore, the length of the overall device in the axial direction can be reduced, and it is thereby possible to design a compact device.

What is claimed is:

1. A hybrid vehicle drive device, comprising:
   a clutch that transmits and separates a driving force between an engine output shaft and a transmission input shaft;
   a first electric motor having a first rotor that is connected to an engine output shaft side member of the clutch;
   a second electric motor having a second rotor that is connected to a transmission input shaft side member of the clutch;
   an intermediate shaft, wherein the first rotor and the engine output shaft side member of the clutch are fixed so as to rotate integrally with the intermediate shaft; and
   a radial vibration suppressing device, wherein:
     (1) the intermediate shaft is connected to the engine output shaft via the radial vibration suppressing device, and (2) the radial vibration suppressing device suppresses a vibration of the engine output shaft in a radial direction,
     the intermediate shaft and the transmission input shaft are fitted so as to be able to rotate relative to each other, and
     the second rotor and the transmission input shaft side member of the clutch are supported so as to be able to rotate relative to an outer circumferential surface of the intermediate shaft.

2. The hybrid vehicle drive device according to claim 1, wherein the radial vibration suppressing device has a stepped shape that includes an inner portion and an outer portion with the inner portion located on the engine output shaft side relative to the outer portion.

3. The hybrid vehicle drive device according to claim 2, wherein the radial vibration suppressing device is a transmission plate with a plate shaped body permitting bending in the radial direction, and one of the engine output shaft and the first rotor of the first electric motor is connected to the inner portion of the radial vibration suppressing device and the other of the engine output shaft and the first rotor of the first electric motor is connected to the outer portion of the radial vibration suppressing device.

4. The hybrid vehicle drive device according to claim 3, wherein the first rotor of the first electric motor is connected to the transmission plate via a flywheel.

5. The hybrid vehicle drive device according to claim 1, wherein the first rotor of the first electric motor is connected to the engine output shaft via a damper that can absorb vibration in a rotational direction.

6. The hybrid vehicle drive device according to claim 5, wherein the intermediate shaft is connected between the clutch and the engine output shaft, wherein the first rotor of the first electric motor and the damper are each separately spline-engaged with the intermediate shaft.

7. The hybrid vehicle drive device according to claim 5, wherein the intermediate shaft is connected between the clutch and the engine output shaft, wherein the first rotor of the first electric motor and the damper are integrally coupled by a coupling member, and the coupling member is spline-engaged with the intermediate shaft.

8. The hybrid vehicle drive device according to claim 3, wherein the first rotor of the first electric motor is connected to the engine output shaft via a damper that can absorb vibration in the rotational direction.

9. The hybrid vehicle drive device according to claim 8, wherein the intermediate shaft is connected between the clutch and the engine output shaft, wherein the first rotor of the first electric motor and the damper are each separately spline-engaged with the intermediate shaft.

10. The hybrid vehicle drive device according to claim 8, wherein the intermediate shaft is connected between the clutch and the engine output shaft, wherein the first rotor of the first electric motor and the damper are integrally coupled by a coupling member, and the coupling member is spline-engaged with the intermediate shaft.

11. The hybrid vehicle drive device according to claim 2, wherein the radial vibration suppressing device includes a step in a middle portion in the radial direction.

12. The hybrid vehicle drive device according to claim 2, wherein the inner portion and the outer portion of the radial vibration suppressing device are flat plates that extend substantially in the radial direction.

13. The hybrid vehicle drive device according to claim 2, wherein the radial vibration suppressing device has a thickness of 2-3 mm.

14. The hybrid vehicle drive device according to claim 2, further comprising a flywheel that connects the radial vibration suppressing device with the first electric motor.

15. A hybrid vehicle drive device, comprising:
   a clutch that transmits and separates a driving force between an engine output shaft and a transmission input shaft;
   a first electric motor having a first rotor that is connected to an engine output shaft side member of the clutch;
   a second electric motor having a second rotor that is connected to a transmission input shaft side member of the clutch;
   an intermediate shaft, wherein the first rotor and the engine output shaft side member of the clutch are fixed so as to rotate integrally with the intermediate shaft; and
   a transmission plate, wherein:
     (1) the intermediate shaft is connected to the engine output shaft via the transmission plate, and (2) the transmission plate suppresses a vibration of the engine output shaft in a radial direction,
     the intermediate shaft and the transmission input shaft are fitted so as to be able to rotate relative to each other, and
     the second rotor and the transmission input shaft side member of the clutch are supported so as to be able to rotate relative to an outer circumferential surface of the intermediate shaft.

16. The hybrid vehicle drive device according to claim 15, wherein the transmission plate has a stepped shape that includes an inner portion and an outer portion, with the inner portion located on the engine output shaft side relative to the outer portion.

17. The hybrid vehicle drive device according to claim 16, wherein the transmission plate includes a step in a middle portion in the radial direction.

18. The hybrid vehicle drive device according to claim 16, wherein the transmission plate has a thickness of 2-3 mm.

19. The hybrid vehicle drive device according to claim 16, further comprising a flywheel that connects the transmission plate with the first electric motor.

20. The hybrid vehicle drive device according to claim 16, wherein the inner portion and the outer portion are flat plates that extend substantially in the radial direction.

* * * * *